US009144041B2

(12) United States Patent
Curtis et al.

(10) Patent No.: US 9,144,041 B2
(45) Date of Patent: Sep. 22, 2015

(54) CAPACITIVE/INDUCTIVE PROXIMITY DETECTION FOR WI-FI PROTECTION

(71) Applicant: Microchip Technology Incorporated, Chandler, AZ (US)

(72) Inventors: Keith Edwin Curtis, Gilbert, AZ (US); Yann LeFaou, Tempe, AZ (US); Fanie Duvenhage, Phoenix, AZ (US)

(73) Assignee: MICROCHIP TECHNOLOGY INCORPORATED, Chandler, AZ (US)

( * ) Notice: Subject to any disclaimer, the term of this patent is extended or adjusted under 35 U.S.C. 154(b) by 304 days.

(21) Appl. No.: 13/693,635

(22) Filed: Dec. 4, 2012

(65) Prior Publication Data
US 2013/0157564 A1 Jun. 20, 2013

Related U.S. Application Data

(60) Provisional application No. 61/570,463, filed on Dec. 14, 2011.

(51) Int. Cl.
*H04W 52/52* (2009.01)
*H04B 1/3827* (2015.01)
*H04W 52/28* (2009.01)

(52) U.S. Cl.
CPC ............ *H04W 52/52* (2013.01); *H04B 1/3838* (2013.01); *H04W 52/283* (2013.01)

(58) Field of Classification Search
CPC ... H04W 52/52; H04W 52/283; H04B 1/3838
USPC ...................... 455/115.4, 127.1, 522; 343/703
See application file for complete search history.

(56) References Cited

U.S. PATENT DOCUMENTS

| 5,986,549 | A | 11/1999 | Teodorescu ..................... 340/561 |
| 7,460,441 | B2 | 12/2008 | Bartling ......................... 368/118 |
| 7,764,213 | B2 | 7/2010 | Bartling et al. ................. 341/152 |
| 8,154,317 | B2 | 4/2012 | Steedman et al. ........ 324/762.01 |
| 8,577,289 | B2 * | 11/2013 | Schlub et al. ................. 455/41.1 |
| 8,775,103 | B1 * | 7/2014 | Jayaraj et al. ................... 702/57 |
| 2008/0051165 | A1 | 2/2008 | Burgan et al. .............. 455/575.6 |
| 2008/0272826 | A1 | 11/2008 | Smit et al. ...................... 327/509 |
| 2010/0181180 | A1 | 7/2010 | Peter ............................. 200/5 R |

(Continued)

FOREIGN PATENT DOCUMENTS

GB    2380359 A    4/2003    ............... H04B 1/38

OTHER PUBLICATIONS

International Search Report and Written Opinion, Application No. PCT/US2012/069105, 12 pages, Mar. 14, 2013.

*Primary Examiner* — Wesley Kim
*Assistant Examiner* — Dong-Chang Shiue
(74) *Attorney, Agent, or Firm* — Slayden Grubert Beard PLLC

(57) ABSTRACT

A combination of capacitive, mutual capacitive, and inductive proximity and touch sensing is used to detect the presence and nature of nearby objects to a wireless device. When the proximity of metal or a user is sensed the output power of a Wi-Fi module in the device is reduced so as to prevent harm to the user and/or the Wi-Fi transmitter amplifier circuits. Inductive sensors located at the four corners of the wireless device are used to detect metal, and capacitive sensors are used to detect a capacitance change or shift due to the presence of a user's hand, body or metal. In addition, the capacitive sensors may be located at the four corners of the device and can measure changes in the mutual capacitance coupling between these capacitive sensors.

9 Claims, 7 Drawing Sheets

(56) References Cited

U.S. PATENT DOCUMENTS

| | | | |
|---|---|---|---|
| 2010/0317302 A1 | 12/2010 | Greenwood et al. | 455/127.1 |
| 2010/0328249 A1* | 12/2010 | Ningrat et al. | 345/174 |
| 2011/0007028 A1 | 1/2011 | Curtis et al. | 345/174 |
| 2011/0141053 A1* | 6/2011 | Bulea et al. | 345/174 |
| 2012/0056847 A1* | 3/2012 | Milford | 345/174 |

* cited by examiner

CAPACITIVE/INDUCTIVE PROXIMITY DETECTION FOR WI-FI PROTECTION

RELATED PATENT APPLICATION

This application claims priority to commonly owned U.S. Provisional Patent Application Ser. No. 61/570,463; filed Dec. 14, 2011; entitled "Capacitive/Inductive Proximity Detection for WIFI Protection," by Keith Edward Curtis, Yann LeFaou and Fanie Duvenhage; which is hereby incorporated by reference herein for all purposes.

TECHNICAL FIELD

The present disclosure relates to a method and apparatus for proximity detection, and, in particular, to protect users and transmitter amplifier electronics in Wi-Fi enabled devices.

BACKGROUND

Wi-Fi is a flexible, short-range data communications technology used to connect devices as diverse as notebooks, tablets, handsets, consumer electronics, smart utility meters and much more. Wi-Fi technology is widely used to provide wireless internet access in public places like airports, hotels and shopping centers, and is also used in the home and office to allow a wide range of devices to access the internet and network with each other without the need for special cables. Wi-Fi devices use low-power radio waves in the 2.4 and 5 GHz range to transmit and receive data over the air. Wherein the greater the Wi-Fi transmit power, the long the range of the Wi-Fi enabled device. However, Wi-Fi devices operate at frequencies that may be potentially harmful to humans when enough radio frequency (RF) power output is produced from the Wi-Fi device. The FCC and other federal governmental agencies around the world require that any wireless device be evaluated to meet RF exposure limits set forth in governmental regulations, e.g., Specific Absorption Rate (SAR) levels.

Therefore a SAR test is necessary in determining maximum allowable RF power output when the Wi-Fi enabled device is in close proximity to a user. The Specific Absorption Rate (SAR) is the unit of measurement for the amount of radio frequency (RF) absorbed by the body when using a wireless device. The SAR value is expressed in terms of watts per kilogram (W/kg) or milliwatts per gram (mW/g). The RF exposure limits used are expressed in the terms of SAR, which is a measure of the electric and magnetic field strength and power density for transmitters operating at frequencies from 300 kHz to 100 GHz. The most generally accepted method for measuring SAR values is the direct method SAR test. This method utilizes a model called a "SAM phantom" to simulate the human head and a "flat phantom" to simulate the human body. With this method, wireless devices are tested at the highest certified power level in laboratory conditions utilizing a SAR test system with a robot.

Therefore, with Wi-Fi enabled devices, it may not be safe for a user of the device if the Wi-Fi feature of the device is in operation at its maximum RF power output when in close proximity to the user's body. It also may not be safe for the Wi-Fi transmitter amplifier used in the device to operate when in close proximity to a large metal object, e.g., metal table top. Thus, Wi-Fi enabled devices need a reliable system, method and apparatus for detecting the presence of a user near the Wi-Fi antenna and the presence of large metal objects.

SUMMARY

Therefore what is needed is an effective way to reduce Wi-Fi transmitter power output when a user is proximate to a Wi-Fi enabled device and/or the Wi-Fi enabled device is proximate to a large metal object.

According to an embodiment, a wireless device may comprise: a Wi-Fi unit; at least one capacitive sensor and at least one inductive sensor located at each corner of said wireless device; and a controller operable to evaluate capacitance and inductance values of each of the at least one capacitive and inductive sensors.

According to a further embodiment, the controller may be configured to determine a mutual capacitance between at least two of the capacitive sensors. According to a further embodiment, a controllable power output radio frequency (RF) amplifier may be provided for amplifying RF signals generated by the Wi-Fi unit, wherein the controller may be further configured to control the controllable RF amplifier based upon results from evaluating the capacitive and inductive values of said capacitive and inductive sensors.

According to a further embodiment, the controller may be a microcontroller and memory, and may further comprises: an inductive sensor interface coupled to the at least one inductive sensor; a capacitive sensor interface coupled to the at least one capacitive sensor; and an analog-to-digital converter (ADC) having analog inputs coupled to the inductive and capacitive sensor interfaces and at least one digital output coupled to the microcontroller; wherein the microcontroller controls the Wi-Fi unit power output.

According to another embodiment, a wireless device comprising: a Wi-Fi unit having a controllable power output radio frequency amplifier; at least one capacitive sensor and at least one inductive sensor located at each corner of said wireless device; and a microcontroller and memory, said microcontroller may further comprise: an inductive sensor interface coupled to the inductive sensors, an capacitive sensor interface coupled to the capacitive sensors, and an analog-to-digital converter (ADC) having analog inputs coupled to the inductive and capacitive sensor interfaces and digital outputs coupled to the microcontroller; wherein the microcontroller determines when there may be a change in a capacitance value of any one of the capacitive sensors, thereafter determines whether there may be a change in an inductance value of any one of the inductive sensors and whether there may be a change in mutual capacitance values between the capacitive sensors; whereby if the capacitive value of any one of the capacitive sensors may have changed and the inductive value of any one of the inductive sensors may have changed then the power output of the radio frequency amplifier may be reduced; and whereby if the capacitive value of any one of the capacitive sensors may have changed and any one of the mutual capacitance values may have changed then the power output of the radio frequency amplifier may be reduced. According to a further embodiment, previous capacitance, mutual capacitance and inductance values may be stored in the memory and compared with present capacitance, mutual capacitance and inductance values in determining any change thereto.

According to yet another embodiment, a method for controlling output power of a Wi-Fi amplifier in a wireless device may comprise the steps of: arranging at least one capacitive sensor and at least one inductive sensor proximate to each corner of said wireless device; and determining a change in a capacitance value of at least one of the capacitive sensors.

According to a further embodiment of the method, if a change in the capacitance value may be detected for the at least one capacitive sensor, then two additional tests may be performed; wherein in a first test, the inductive sensors may be evaluated for detecting the proximity of metal thereto, and in a second test, mutual capacitances may be determined between the capacitive sensors located at each corner of the wireless device. According to a further embodiment of the method, the step of reducing the output power level of the Wi-Fi amplifier when a change in the capacitance value may comprise the steps of detecting and determining the mutual capacitances to indicate an object proximate to said wireless device. According to a further embodiment of the method, the step of reducing the output power level of the Wi-Fi amplifier when a change in the capacitance value may comprise the step of detecting a change in an inductance value of at least one of the inductive sensors indicates proximity of metal to the wireless device.

According to still another embodiment, a method for controlling output power of a Wi-Fi amplifier in a wireless device may comprise the steps of: measuring capacitance values of capacitive sensors located in each corner of the wireless device; measuring inductance values of inductive sensors located in each corner of the wireless device; measuring mutual capacitance value between the capacitive sensors located in each corner of the wireless device; detecting when a change occurs in the capacitance value of any one or more of the capacitive sensors, and when the change occurs: determining if any one or more of the mutual capacitance values have changed, and determining if a change occurs in the inductance value of any one or more of the inductive sensors; reducing the power output of the radio frequency amplifier when the capacitive value of any one of the capacitive sensors may have changed and the inductive value of any one of the inductive sensors may have changed; and reducing the power output of the radio frequency amplifier when the capacitive value of any one of the capacitive sensors may have changed and any one of the mutual capacitance values may have changed.

According to a further embodiment of the method, the step of detecting when a change occurs in the capacitance value of any one or more of the capacitive sensors may further comprise the steps of: storing measured capacitance values of the capacitive sensors in a memory; comparing subsequently measured capacitance values of the capacitive sensors with respective ones of the capacitance values stored in the memory; and determining whether at least one of the subsequently measured capacitance values may be substantially different from the respective one of the capacitance values stored in the memory; wherein if at least one of the subsequently measured capacitance values may be substantially different then continue determining if at least one of the mutual capacitance values may have changed and if at least one of the inductance values may have changed.

According to a further embodiment of the method, the step of determining if at least one of the mutual capacitance values may have changed may comprise the steps of: storing mutual capacitance values between the capacitive sensors in the memory; comparing subsequently measured mutual capacitance values between the capacitive sensors with respective ones of the mutual capacitance values stored in the memory; and determining whether at least one of the subsequently measured mutual capacitance values may be substantially different from the respective one of the mutual capacitance values stored in the memory.

According to a further embodiment of the method, the step of determining if at least one of the inductance values may have changed may comprise the steps of: storing inductance values in the memory; comparing subsequently measured inductance values with respective ones of the inductance values stored in the memory; and determining whether at least one of the subsequently measured inductance values may be substantially different from the respective one of the inductance values stored in the memory.

BRIEF DESCRIPTION OF THE DRAWINGS

A more complete understanding of the present disclosure may be acquired by referring to the following description taken in conjunction with the accompanying drawings wherein.

Figure 1:
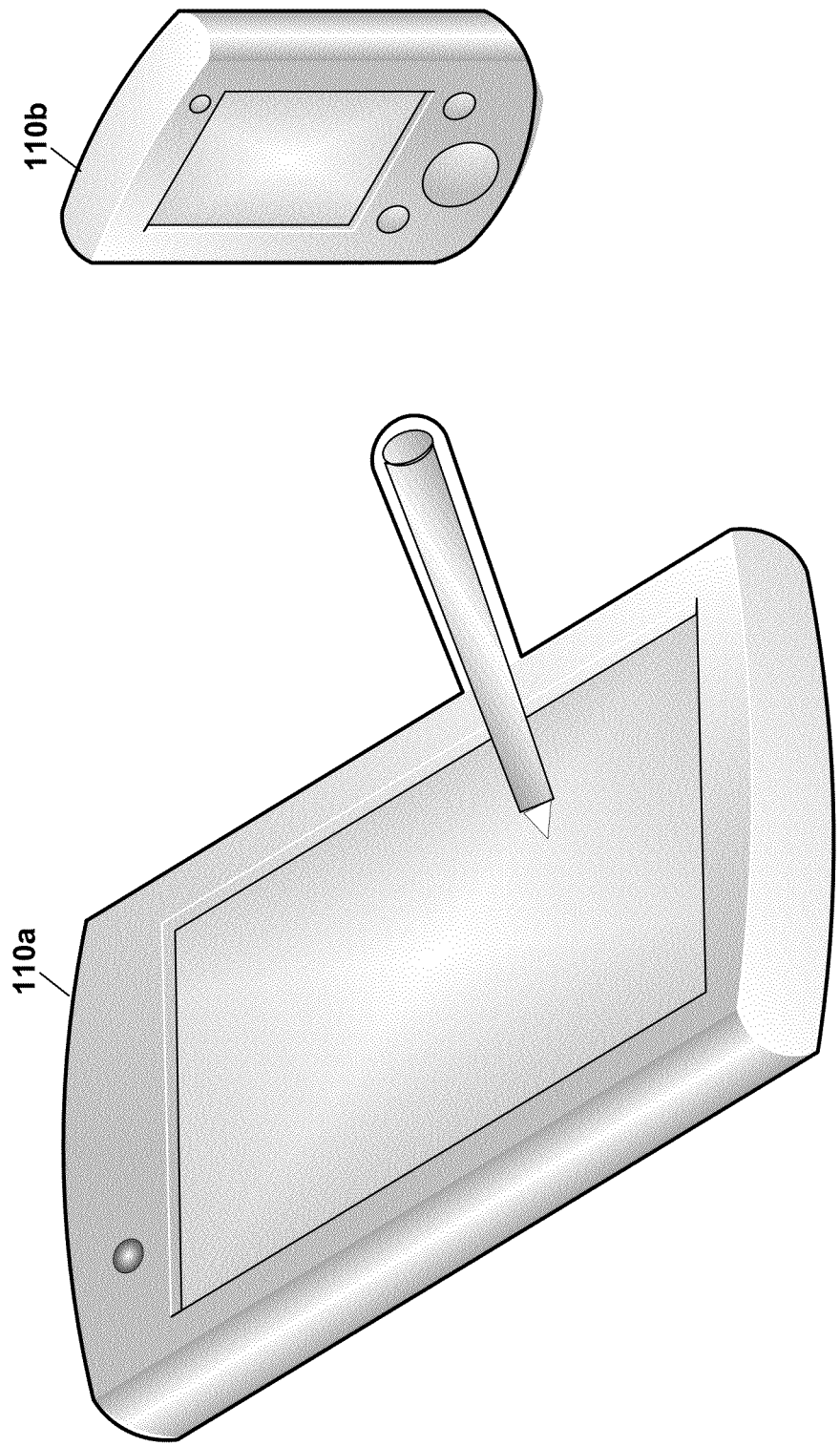
FIG. 1 illustrates some wireless devices, e.g., a tablet computer and a personal digital assistant.

While the present disclosure is susceptible to various modifications and alternative forms, specific example embodiments thereof have been shown in the drawings and are herein described in detail. It should be understood, however, that the description herein of specific example embodiments is not intended to limit the disclosure to the particular forms disclosed herein, but on the contrary, this disclosure is to cover all modifications and equivalents as defined by the appended claims.

DETAILED DESCRIPTION

According to embodiments of this disclosure, a combination of capacitive, mutual capacitive, and inductive proximity and touch sensing technologies may be used to detect the presence and nature of nearby objects. This methodology senses the proximity of metal, or a user, and alerts the controlling microcontroller to turn off, or adjust, the output power of the Wi-Fi module in a wireless device so as to prevent harm to the user and/or the Wi-Fi transmitter amplifier circuits therein. Inductive sensors located at the four corners of a wireless device can be used to detect metal, and capacitive sensors can be used to detect a capacitance change or shift due to the presence of a user's hand, body or metal. In addition, the capacitive sensors may be located at the four corners of the wireless device and can measure changes in the mutual capacitance coupling between these capacitive sensors.

Referring now to the drawings, the details of specific example embodiments are schematically illustrated. Like elements in the drawings will be represented by like numbers, and similar elements will be represented by like numbers with a different lower case letter suffix.

Referring to FIG. 1, depicted are some wireless devices, e.g., a tablet computer and a personal digital assistant. Generally these tablet computer 110a and personal digital assistant (PDA) 110b, e.g., smart phone, devices have wireless communications capabilities built in, e.g., Wi-Fi. Wireless communications requires an antenna, transmitter and receiver in the device 110. The antenna (not shown) is built into the device 110 and the transmitter (not shown) must have enough radio frequency (RF) power output to effectively communicate at a desired distance from a base station, e.g., Wi-Fi hub or router (not shown). Problems may exist however when the device 110 is in close proximity to a human user and the transmitter output power exceeds safe limits set by the government, and/or the device 110 is in close proximity to a RF conductive object, e.g., metal table top (not shown). Either situation requires that the wireless transmitter output power be reduced to comply with government health and safety standards, or to protect the wireless transmitter from an antenna load mismatch caused by the RF conductive object detuning the transmitting antenna in the device.

Figure 2:
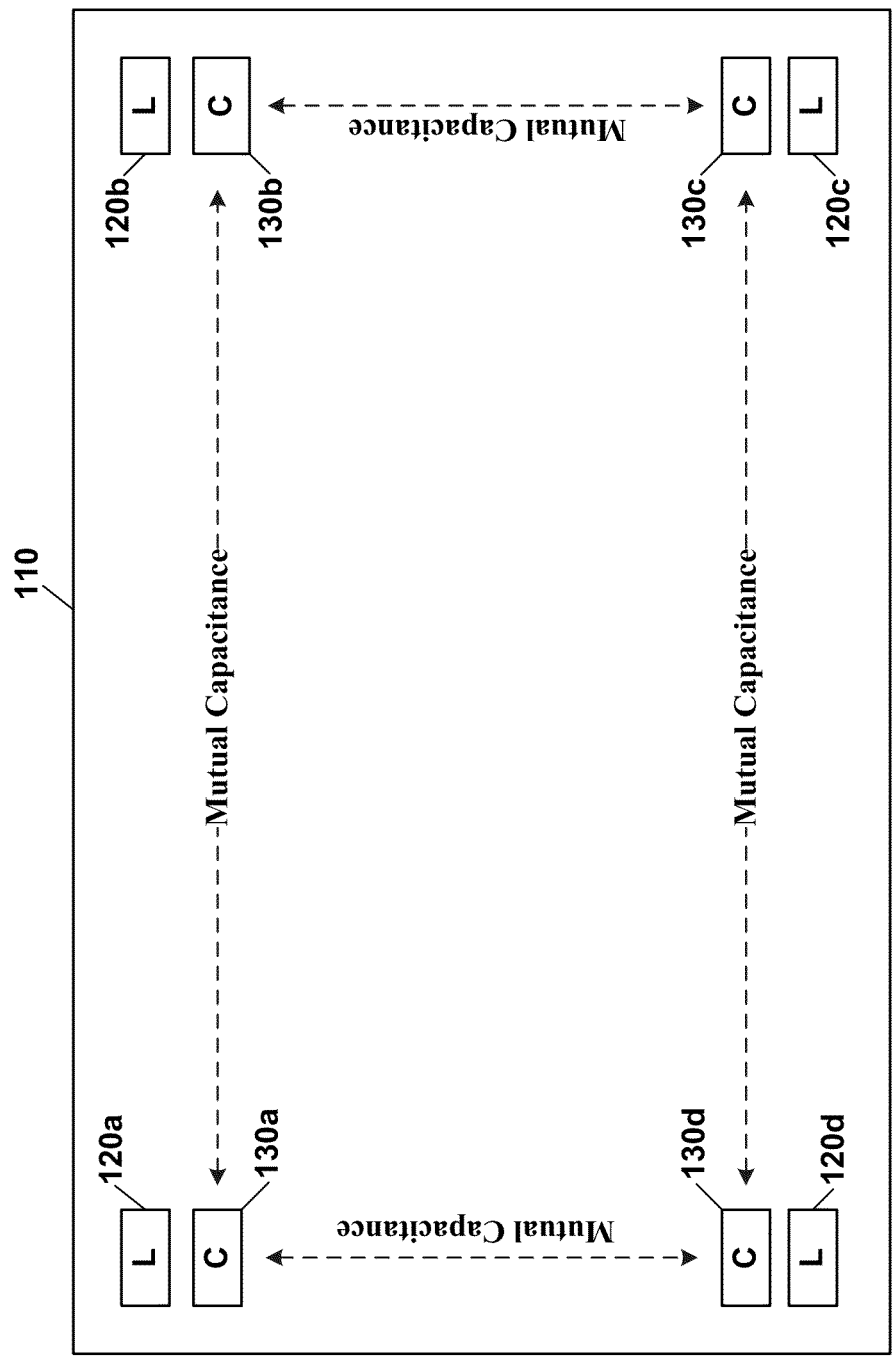
FIG. 2 illustrates a schematic plan view of inductive and capacitive sensors located on a plane of a wireless device, e.g., the tablet computer or personal digital assistant shown in FIG. 1, according to a specific example embodiment of this disclosure.

Referring to FIG. 2, depicted is a schematic plan view of inductive and capacitive sensors located on a plane of a wireless device, e.g., the tablet computer or personal digital assistant shown in FIG. 1, according to a specific example embodiment of this disclosure. Shown is an exemplary arrangement of sensors within a Wi-Fi enabled wireless device 110. In each corner of the plane of the device 110 a pair of inductive (120) and capacitive (130) sensors are arranged therein. The capacitive sensors 130a-d, located at each corner of the plane of the device 110, can detect an object, e.g., user, and may trigger a further analysis when a change in the electrical field proximate to a capacitive sensor 130 changes. When this occurs, two additional tests may be performed; one is an inductive change test determined with the inductive sensors 120 to test for the proximity of metal, and the second, is a test for mutual capacitance values between the four capacitive sensors 130a-d located at each corner of the device 110.

The inductive change test determines if the device 110 is proximate to a metal object, e.g., metal table top, the mutual capacitance looks for coupling of an object, (user) between some of the capacitive sensors 130, but not all. If the mutual capacitance test shows a pattern consistent with proximity of a user, then the RF power output of the Wi-Fi transmitter is reduced to a safe level for human use. If the inductive change test shows a pattern consistent with a metal table top, then the RF power output of the Wi-Fi transmitter is reduced to prevent damage to the Wi-Fi transmit amplifier. If all of the mutual capacitance values are substantially equal, and no metal is detected, then the Wi-Fi transmitter is run at full power output.

Figure 3:
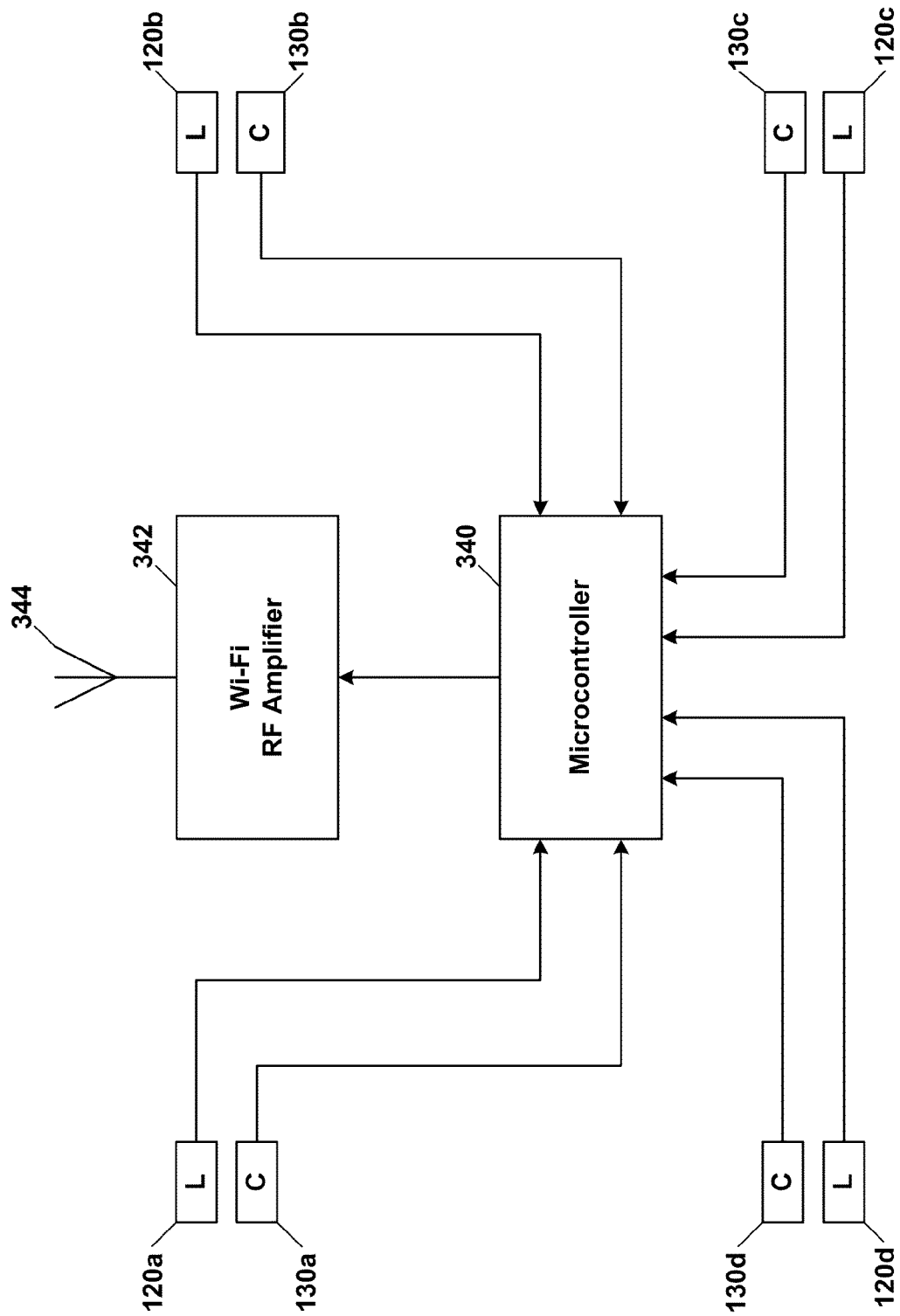
FIG. 3 illustrates a schematic block diagram of the inductive and capacitive sensors shown in FIG. 2 coupled to circuit functions within the wireless device, according to a specific example embodiment of this disclosure.

Referring to FIG. 3, depicted is a schematic block diagram of the inductive and capacitive sensors shown in FIG. 2 coupled to circuit functions within the wireless device, according to a specific example embodiment of this disclosure. The inductive sensors 120 and the capacitive sensors 130 may be coupled to a microcontroller 340 that may control the power output of the Wi-Fi RF amplifier 342. A Wi-Fi antenna 344 is coupled to the Wi-Fi RF amplifier 342. The inductive sensors 120, the capacitive sensors 130, the microcontroller 340, the Wi-Fi RF amplifier 342 and the Wi-Fi antenna 344 are located in and integral with the wireless device 110.

Figure 4:
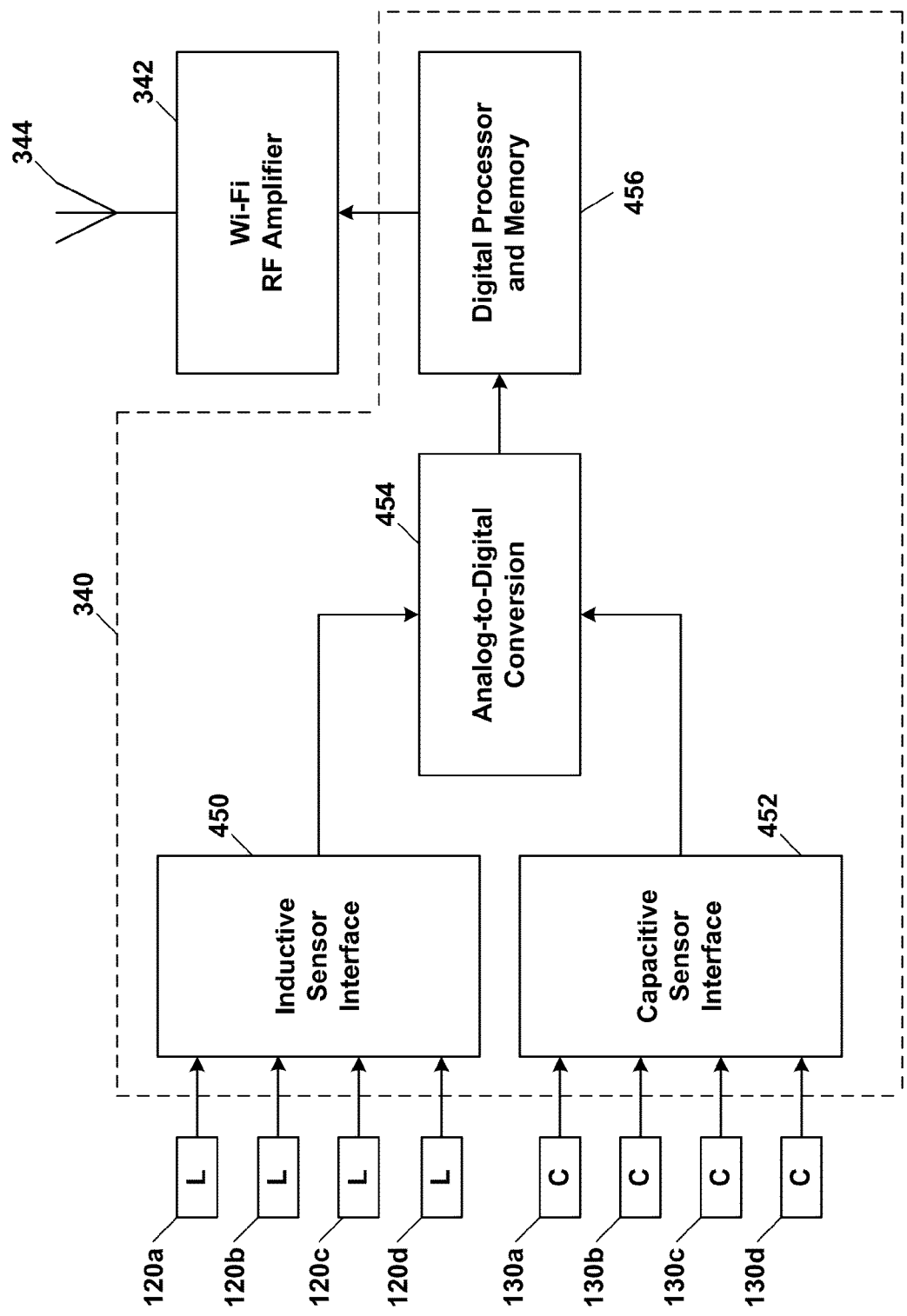
FIG. 4 illustrates a more detailed schematic block diagram of the circuit functions shown in FIG. 3, according to a specific example embodiment of this disclosure.

Referring to FIG. 4, depicted is a more detailed schematic block diagram of the circuit functions shown in FIG. 3, according to a specific example embodiment of this disclosure. The microcontroller 340 may comprise an inductive sensor interface 450, a capacitive sensor interface 452, analog-to-digital conversion 454, and a digital processor and memory 456. The microcontroller 340 determines the capacitance changes and/or capacitance values of the capacitive sensors 130, and the inductance changes and/or inductance values of the inductive sensors 120. The microcontroller 340 then evaluates any capacitive and/or inductive values changes that may occur, and when appropriate will control a power reduction in the Wi-Fi RF amplifier 342.

The microcontroller 340 may comprise any one or more capacitance measurement circuits that have the necessary capacitance resolution. For example, but not limited to, a Charge Time Measurement Unit (CTMU) may be used for very accurate capacitance measurements. The CTMU is more fully described in Microchip applications notes AN1250 and AN1375, available at www.microchip.com, and commonly owned U.S. Pat. No. 7,460,441 B2, entitled "Measuring a long time period;" and U.S. Pat. No. 7,764,213 B2, entitled "Current-time digital-to-analog converter," both by James E. Baffling; wherein all of which are hereby incorporated by reference herein for all purposes.

The microcontroller 340 may comprise a combined capacitance measurement circuit and a capacitance change sensing circuit to detect a change in capacitance of the capacitive sensors 130. For example, a Capacitive Voltage Divider (CVD) circuit may be used according to AN1298, available at www.microchip.com, and commonly owned U.S. Patent Application Publication No.: US 2010/0181180 A1, entitled "Capacitive Touch Sensing Using an Internal Capacitor of an Analog-to-Digital Converter (ADC) and a Voltage Reference" by Dieter Peter. A Capacitive Sensing Module (CSM) circuit may be used according to AN1171, AN1312 and AN1334, available at www.microchip.com, and commonly owned U.S. Patent Application No.: US 2011/0007028 A1, entitled "Capacitive Touch System With Noise Immunity" by Keith E. Curtis, et al.; wherein all of which are hereby incorporated by reference herein for all purposes.

Another capacitive change sensing/detection circuit may be a tuned circuit using each of the capacitive sensors 130 as one of the frequency determining elements and a frequency discriminator circuit, as more fully described in commonly owned U.S. Patent Application Publication No.: US 2008/0272826 A1, entitled "Interrupt/Wake-Up of an Electronic Device in a Low Power Sleep Mode When Detecting a Sensor or Frequency Source Activated Frequency Change" by Zacharias Marthinus Smit, et al., and is hereby incorporated by reference herein for all purposes.

The microcontroller 340 may comprise inductive proximity sensing/detection circuits as more fully described in commonly owned U.S. Pat. No. 8,154,317 B2; entitled "Integrated Circuit Device to Support Inductive Sensing," by Sean Steedman, et al. Detailed application information for inductive proximity sensing is described in "mTouch™ Inductive Touch User's Guide," DS41407A, © 2009 Microchip Technology Inc., available at www.microchip.com. Both of which are hereby incorporated by reference herein for all purposes.

Figure 5:
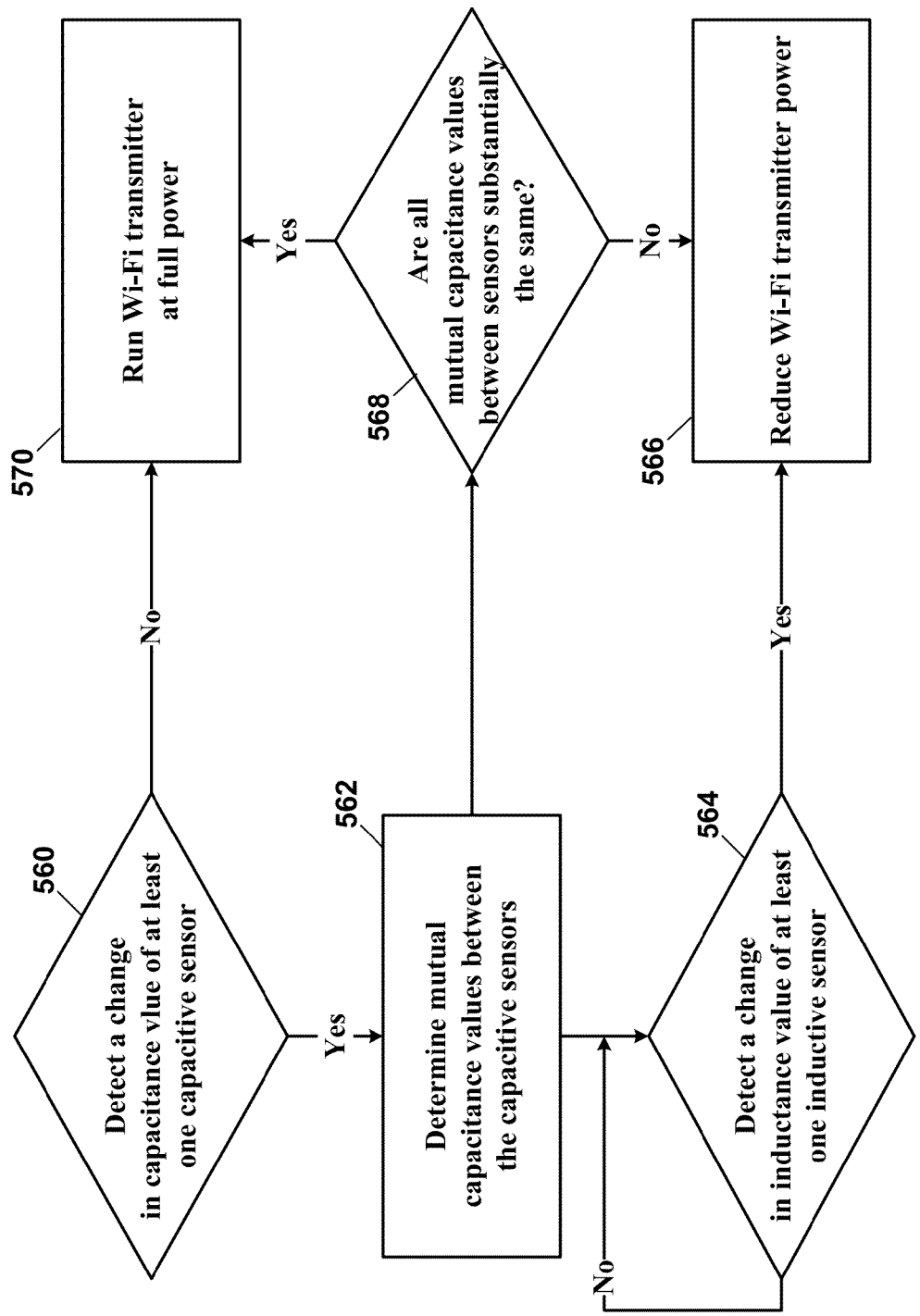
FIG. 5 illustrates a schematic process flow diagram of the operation of the inductive and capacitive sensors in combination with the circuit functions within the wireless device, according to a specific example embodiment of this disclosure.

Referring to FIG. 5, depicted is a schematic process flow diagram of the operation of the inductive and capacitive sensors in combination with the circuit functions within the wireless device, according to a specific example embodiment of this disclosure. In step 560 a determination is made whether a change in capacitance value of at least one of the capacitive sensors 130 has occurred. If no change in the capacitance value of at least one of the capacitive sensors 130 has occurred, then in step 570 the Wi-Fi transmitter RF power amplifier 342 is enabled to run at full output power. If there is a change in the capacitance value of at least one of the capacitive sensors 130, then in step 562 a determination is made of the mutual capacitances between the capacitive sensors 130 located at each corner of the device 110.

In step 568 a determination is made whether all mutual capacitance values between the capacitive sensors 130 are substantially the same. If all of the mutual capacitance values between the capacitive sensors 130 are substantially the same, then the Wi-Fi transmitter RF power amplifier 342 power output remains at full power. If any one or more of the mutual capacitance values between the capacitive sensors 130 are different, then in step 566 the Wi-Fi transmitter RF power amplifier 342 power output is reduced.

In step 564 a determination is made whether a change in inductance value of at least one of the inductive sensors 120 has occurred. If there is a change in the inductance value of at least one of the inductive sensors 120, then in step 566 the Wi-Fi transmitter RF power amplifier 342 power output is reduced.

Figure 6:
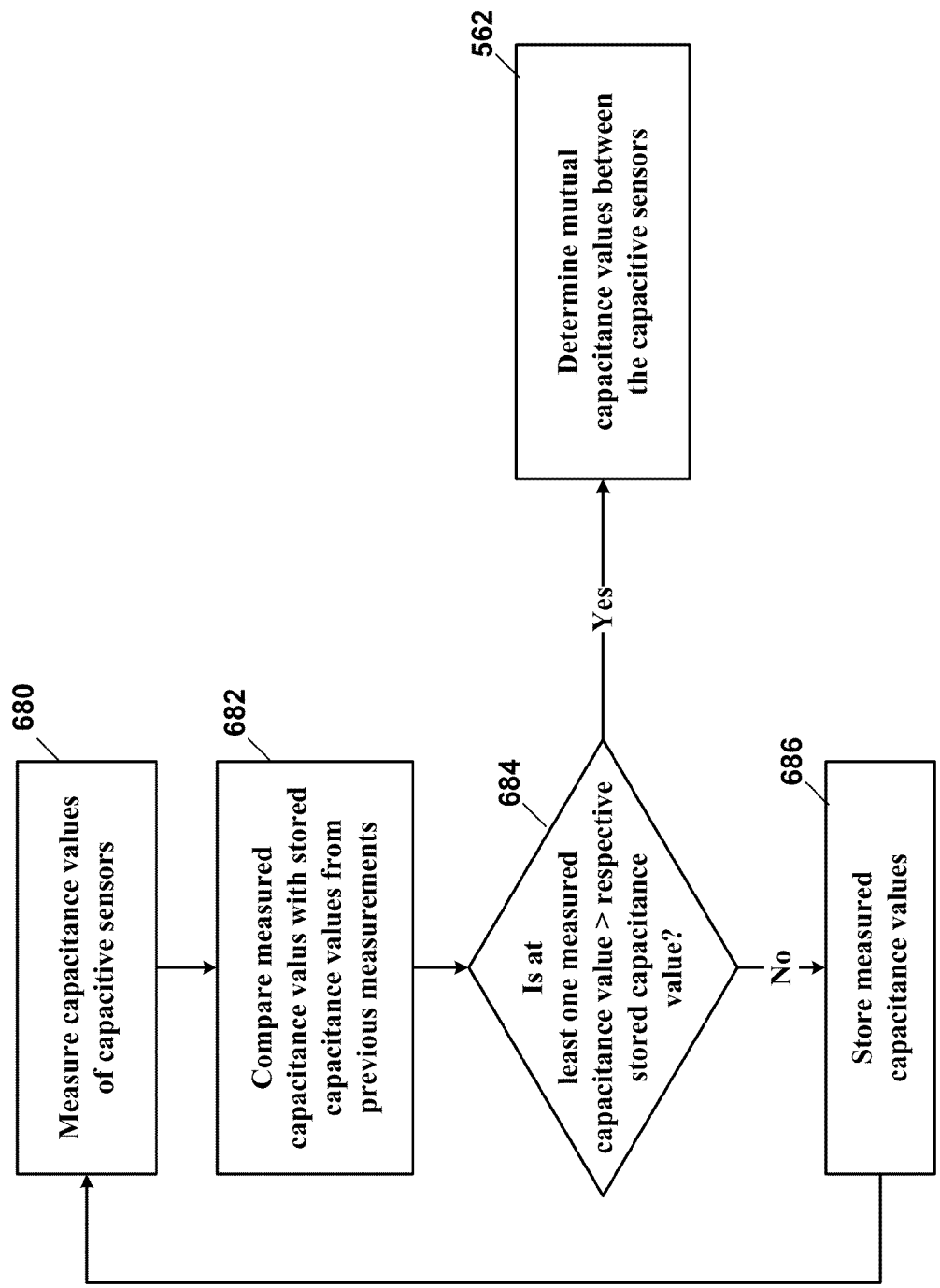
FIG. 6 illustrates a more detailed schematic process flow diagram of one embodiment for determining capacitance values of the capacitive sensors.

Referring to FIG. 6, depicted is a more detailed schematic process flow diagram of one embodiment for determining capacitance values of the capacitive sensors 130. In step 680 capacitance values are measured for each of the capacitive sensors 130. In step 682 the measured capacitance values are compared to stored previously measured capacitance values of the capacitive sensors 130. In step 684 a determination is made whether at least one of the measured capacitance values has changed from the respective previously measured and stored capacitance values.

Figure 7:
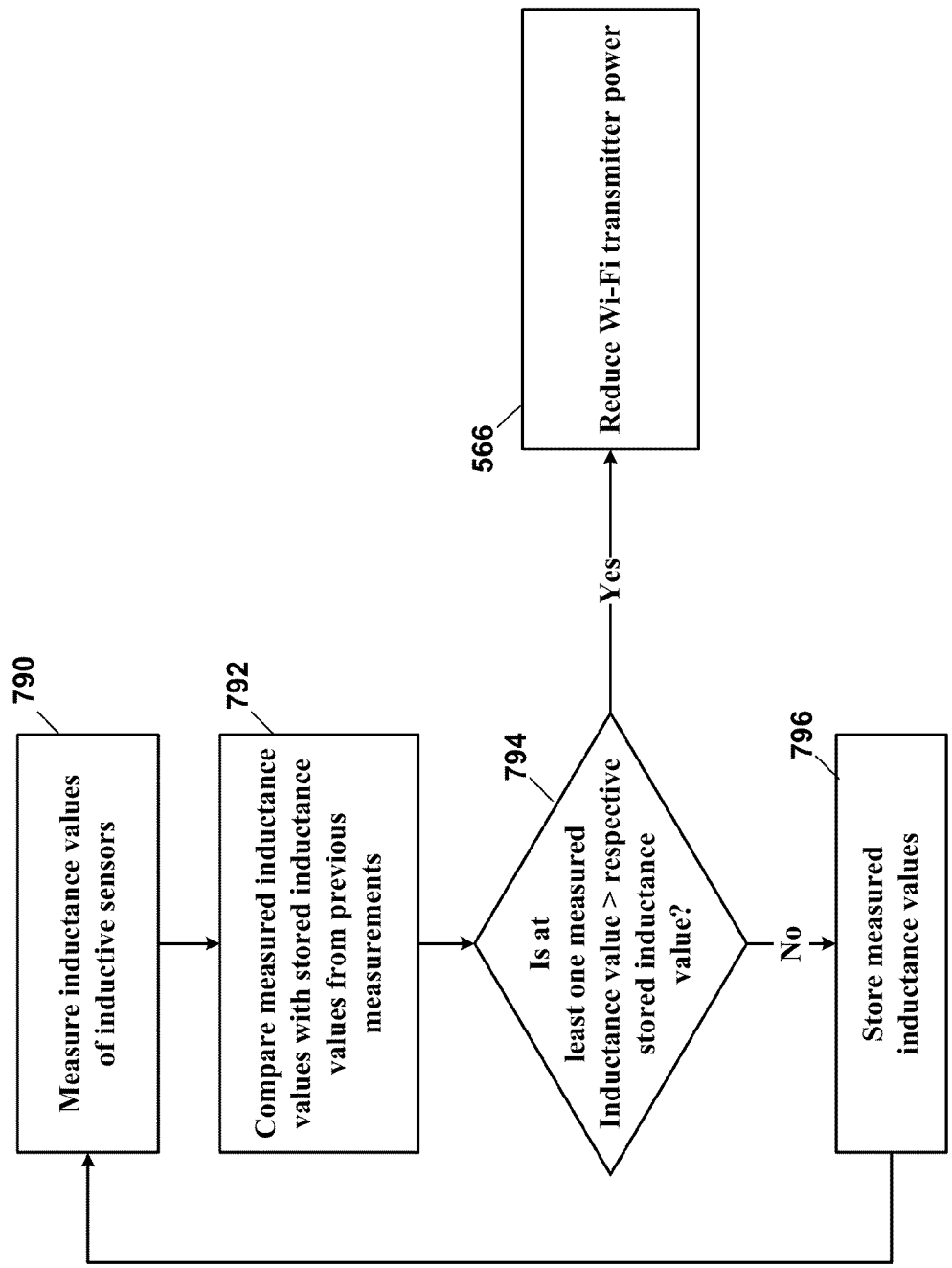
FIG. 7 illustrates a more detailed schematic process flow diagram of one embodiment for determining inductance values of the inductive sensors.

Referring to FIG. 7, depicted is a more detailed schematic process flow diagram of one embodiment for determining inductance values of the inductive sensors. In step 790 inductance values are measured for each of the inductive sensors 120. In step 792 the measured inductance values are compared to stored previously measured inductance values of the inductive sensors 120. In step 794 a determination is made whether at least one of the measured inductance values has changed from the respective previously measured and stored inductance values.

While embodiments of this disclosure have been depicted, described, and are defined by reference to example embodiments of the disclosure, such references do not imply a limitation on the disclosure, and no such limitation is to be inferred. The subject matter disclosed is capable of considerable modification, alteration, and equivalents in form and function, as will occur to those ordinarily skilled in the pertinent art and having the benefit of this disclosure. The depicted and described embodiments of this disclosure are examples only, and are not exhaustive of the scope of the disclosure.

What is claimed is:

1. A wireless device comprising:
   a Wi-Fi unit having a controllable power output radio frequency amplifier;
   at least one capacitive sensor and at least one inductive sensor located at each corner of said wireless device; and
   a microcontroller and memory, said microcontroller further comprising:
   an inductive sensor interface coupled to the inductive sensors,
   a capacitive sensor interface coupled to the capacitive sensors, and
   an analog-to-digital converter (ADC) having analog inputs coupled to the inductive and capacitive sensor interfaces and digital outputs coupled to the microcontroller;
   wherein the microcontroller determines when there is a change in a capacitance value of any one of the capacitive sensors, thereafter determines whether there is a change in an inductance value of any one of the inductive sensors and whether there is a change in mutual capacitance values between the capacitive sensors;
   whereby if the capacitive value of any one of the capacitive sensors has changed and the inductive value of any one of the inductive sensors has changed then the power output of the radio frequency amplifier is reduced; and
   whereby if the capacitive value of any one of the capacitive sensors has changed and any one of the mutual capacitance values has changed then the power output of the radio frequency amplifier is reduced.

2. The wireless device according to claim 1, wherein previous capacitance, mutual capacitance and inductance values are stored in the memory and compared with present capacitance, mutual capacitance and inductance values in determining any change thereto.

3. A method for controlling output power of a Wi-Fi amplifier in a wireless device, said method comprising the steps of:
   arranging at least one capacitive sensor and at least one inductive sensor proximate to each corner of said wireless device; and
   determining a change in a capacitance value of at least one of the capacitive sensors, wherein if a change in the capacitive value is detected for the at least one capacitive sensor, then two additional tests are performed; wherein in a first test, the inductive sensors are evaluated for detecting the proximity of metal thereto, and in a second test, mutual capacitances are determined between the capacitive sensors located at each corner of the wireless device.

4. The method according to claim 3, further comprising the step of reducing the output power level of the Wi-Fi amplifier when a change in the capacitance value is detected and the mutual capacitances are determined to indicate an object proximate to said wireless device.

5. The method according to claim 3, further comprising the step of reducing the output power level of the Wi-Fi amplifier when a change in the capacitance value is detected and a change in an inductance value of at least one of the inductive sensors indicates proximity of metal to the wireless device.

6. A method for controlling output power of a Wi-Fi amplifier in a wireless device, said method comprising the steps of:
   measuring capacitance values of capacitive sensors located in each corner of the wireless device;
   measuring inductance values of inductive sensors located in each corner of the wireless device;
   measuring mutual capacitance value between the capacitive sensors located in each corner of the wireless device;
   detecting when a change occurs in the capacitance value of any one or more of the capacitive sensors, and when the change occurs:
   determining if any one or more of the mutual capacitance values have changed, and
   determining if a change occurs in the inductance value of any one or more of the inductive sensors;
   reducing the power output of the radio frequency amplifier when the capacitive value of any one of the capacitive sensors has changed and the inductive value of any one of the inductive sensors has changed; and
   reducing the power output of the radio frequency amplifier when the capacitive value of any one of the capacitive sensors has changed and any one of the mutual capacitance values has changed.

7. The method according to claim 6, wherein the step of detecting when a change occurs in the capacitance value of any one or more of the capacitive sensors further comprises the steps of:

storing measured capacitance values of the capacitive sensors in a memory;

comparing subsequently measured capacitance values of the capacitive sensors with respective ones of the capacitance values stored in the memory; and determining whether at least one of the subsequently measured capacitance values is substantially different from the respective one of the capacitance values stored in the memory;

wherein if at least one of the subsequently measured capacitance values is substantially different then continue determining if at least one of the mutual capacitance values has changed and if at least one of the inductance values has changed.

8. The method according to claim 7, wherein the step of determining if at least one of the mutual capacitance values has changed comprises the steps of:

storing mutual capacitance values between the capacitive sensors in the memory;

comparing subsequently measured mutual capacitance values between the capacitive sensors with respective ones of the mutual capacitance values stored in the memory; and determining whether at least one of the subsequently measured mutual capacitance values is substantially different from the respective one of the mutual capacitance values stored in the memory.

9. The method according to claim 7, wherein the step of determining if at least one of the inductance values has changed comprises the steps of:

storing inductance values in the memory;

comparing subsequently measured inductance values with respective ones of the inductance values stored in the memory; and determining whether at least one of the subsequently measured inductance values is substantially different from the respective one of the inductance values stored in the memory.

\* \* \* \* \*